United States Patent [19]

Takagi

[11] Patent Number: 5,784,351
[45] Date of Patent: Jul. 21, 1998

[54] LOADING APPARATUS FOR DISK CARTRIDGE

[75] Inventor: Koji Takagi, Kanagawa, Japan

[73] Assignee: Sony Corporation, Japan

[21] Appl. No.: 732,277

[22] PCT Filed: Apr. 19, 1996

[86] PCT No.: PCT/JP96/01070

§ 371 Date: Oct. 29, 1996

§ 102(e) Date: Oct. 29, 1996

[87] PCT Pub. No.: WO96/33489

PCT Pub. Date: Oct. 24, 1996

[30] Foreign Application Priority Data

Apr. 19, 1995 [JP] Japan ................ 7-119327

[51] Int. Cl.$^6$ ............................................. G11B 33/02
[52] U.S. Cl. ............................................. 369/77.2
[58] Field of Search ........................ 369/75.1–75.2, 369/77.1–77.2; 360/99.02, 99.06

[56] References Cited

U.S. PATENT DOCUMENTS 5,386,406  1/1995  Ikuma et al. ............ 369/77.2
5,448,434  9/1995  Hirose ...................... 369/77.1

FOREIGN PATENT DOCUMENTS

| 1-159861 | 6/1989 | Japan | 369/77.2 |
| 4-186555 | 7/1992 | Japan | 369/77.2 |
| 6-325457 | 11/1994 | Japan . | |
| 7-939934 | 4/1995 | Japan . | |

*Primary Examiner*—Allen Cao
*Attorney, Agent, or Firm*—Limbach & Limbach L.L.P.

[57] ABSTRACT

A loading apparatus for a disk cartridge having an opening portion and a shutter provided freely movable so as to open and close the opening portion the loading apparatus comprising a cartridge holder with the disk cartridge inserted thereto and supporting the inserted disk cartridge, a rotation drive mechanism for supporting a disk housed in the disk cartridge in at least one direction of directions perpendicular to a surface of the disk cartridge and rotating the disk, and a shutter releasing member for opening a shutter of the disk cartridge inserted into the cartridge holder, wherein the shutter releasing member releases the shutter of the disk cartridge so that the shutter fully opens the opening portion before the disk cartridge inserted into the cartridge holder reaches the rotation drive mechanism.

9 Claims, 16 Drawing Sheets

LOADING APPARATUS FOR DISK CARTRIDGE

TECHNICAL FIELD

The present invention relates to a loading apparatus for disk cartridge for use with a disk recording and reproducing apparatus for recording or reproducing and recording and reproducing information in or from a disk housed in a disk cartridge with an opening portion and a shutter which opens and closes the opening portion.

BACKGROUND ART

When a disk recording and reproducing apparatus records or reproduces and records and reproduces a disk, during a disk cartridge is loaded, i.e., in the disk cartridge loading operation, a shutter is opened and the disk exposed to the opening portion is chucked at its central portion to the turntable.

FIGS. 14 and 15 show a conventional disk cartridge loading apparatus for such disk recording and reproducing apparatus and in which a disk is loaded on the disk recording and reproducing apparatus while a shutter of a disk cartridge is being opened.

This disk loading apparatus 1 comprises a main chassis 5 to which a disk rotation mechanism 4 comprising a spindle motor 2 and a turntable 3 is attached, a cartridge holder 7 for holding a disk cartridge 6 such that the disk cartridge 6 can be loaded and unloaded, a slider 8 slidably moved over the main chassis 5 in the front and rear direction thereby to elevate or lower the cartridge holder 7 relative to the main chassis 5, i.e., turntable 3, and a clamper supporting plate 10 elevated and lowered by the slider 8 so as to move a disk clamper 9 inside or outside of a clamper insertion window 7a of the cartridge holder 7.

The cartridge holder 7 of this loading apparatus 1 includes a shutter opening and closing mechanism 12 for opening and closing the shutter 11 which opens and closes an opening portion 6a for exposing a part of a disk D housed in the disk cartridge 6 from the central portion to the outer peripheral direction. The shutter opening and closing mechanism 12 pivotally supports a shutter opening and closing arm 13 located at the second half portion of the cartridge holder 7, i.e., at the rearward of a chucking portion to which the turntable 6 and the disk clamper 9 are opposed and having an engagement protrusion 13a attached to the tip end thereof. Also, the shutter opening and closing mechanism is constantly spring-biased forward under spring force of a spring member 14.

In the thus arranged loading apparatus 1, the cartridge holder 7 is placed in the elevated position relative to the main chassis 5 by the slider in such a manner that the lower surface of the cartridge holder 7 is substantially in flush with the centering portion 3a of the turntable 3 under the condition that the disk cartridge 6 is not inserted into the cartridge holder 7. Also, the clamper supporting plate 10 is placed at the elevated position by the slider such that the disk damper may be prevented from being inserted into the inside from the clamper insertion window 7a of the cartridge holder 7.

Therefore, if the disk cartridge 6 is inserted into the cartridge holder 7, then the disk cartridge 6 is brought into the position at which the turntable 3 and the disk clamper 9 are opposed to each other under the condition that the shutter 11 is closed. Further, if the disk cartridge 6 is inserted and passed through the chucking portion, then the engagement protrusion 13a of the shutter opening and closing arm 13 of the shutter opening and closing mechanism 12 is engaged with the engagement portion of the shutter 11. Under this condition, if the disk cartridge 6 is pressed and further inserted, then the shutter opening and closing arm 13 is rotated backward against a spring-biasing force of the spring member 14. At the same time the shutter opening and closing arm 13 is rotated backward, the shutter 11 is opened and under the condition that the disk cartridge 6 is inserted into the end of the cartridge holder 7, the shutter opening and closing arm 13 also is rotated to the end, whereby the shutter 11 is fully opened and a part of the housed disk D from the central portion to the outer peripheral direction is exposed to the outside from the opening portion 6a.

As described above, under the condition that the disk cartridge 6 is inserted into the end of the cartridge holder 7, the shutter 11 is fully opened and a part of the housed disk D from the central portion to the outer peripheral direction is exposed to the outside, when the slider 8 is slid, the whole of the cartridge holder 7 is vertically lowered and the disk D is mounted at its central portion on the turntable 3 so that a central aperture is engaged with the centering portion 3a. Also, the clamper supporting plate 10 also is lowered, whereby the clamper 9 is inserted into the inside from the clamper insertion window 7a of the cartridge holder 7 and urged against the central portion of the disk D in an opposing relation to the turntable 3. As a result, the clamper is attracted by a magnet attached to the centering portion 3a of the turntable 3 and can be rotated together with the turntable 3, thereby the loading being ended. In this state, the disk D is rotated with a distance from the inner surface of the disc cartridge 6 by the spindle motor 2, whereby a recorded information signal is read out from the disk D by a pickup device, not shown, attached to the main chassis 5 so as to become movable along the radius direction of the disk D.

In the disk cartridge loading apparatus in the disk recording and reproducing apparatus, as mentioned before, the disk cartridge 6 should pass the chucking portion, i.e., turntable 3, more precisely, the centering portion 3a and the clamper 9 swingably and vertically supported to the clamper supporting plate 10 under the condition that the shutter 11 is closed. Therefore, as shown in FIG. 15, the thickness of the main portion of this loading mechanism cannot be made thinner than a total thickness of a thickness a of the disk cartridge 6, a thickness b of the centering portion 3a of the turntable 3 and a thickness c of the clamper 9 including the supporting portion. Accordingly, a whole thickness A of the loading mechanism 1 increases, thus hindering the disk apparatus from being reduced in thickness.

Since an amount in which the cartridge holder 7 is vertically moved and an amount in which the damper supporting plate 10 supporting the damper 9 is vertically moved are not equal to each other after the loading operation was finished, a mechanism such as the slider 8 for moving the cartridge holder 7 and the damper supporting plate 10 becomes complicated in arrangement, becomes degraded in reliability and also becomes expensive.

DISCLOSURE OF INVENTION

In view of the aforesaid aspect, it is an object of the present invention to provide a disk apparatus in which a disk cartridge loading mechanism can be reduced in thickness and simplified in structure so that the disk apparatus can be made highly reliable and inexpensive.

A loading apparatus according to the present invention is a loading apparatus for a disk cartridge with an opening portion defined therein and which has a shutter freely slidable for opening and closing the opening portion. The loading apparatus includes a cartridge holder with a disk cartridge inserted thereto and holding the inserted disk cartridge, a rotation driving means for holding a disk housed in the disk cartridge at least in one direction perpendicular to the disk cartridge surface and rotating such disk and a shutter releasing means for releasing the shutter of the disk cartridge inserted into the cartridge holder, wherein the shutter releasing means releases the shutter of the disk cartridge and the opening portion of the disk cartridge before the disk cartridge reaches the rotation driving means.

The loading apparatus according to the present invention further includes a supporting means for supporting the shutter of the disk cartridge, opened by the shutter releasing means, at the position in which the opening portion of the disk cartridge is opened.

Further, the supporting means includes a restricting portion protruded from the cartridge holder to the inner surface of the cartridge holder so as to be engaged with the shutter of the disk cartridge.

Further, the shutter releasing means releases the opening operation of the shutter of the disk cartridge under the condition that the shutter of the disk cartridge is supported by the supporting means.

Further, the shutter releasing means includes an opening arm rotatably provided on the cartridge holder, placed at the insertion mouth side of the disk cartridge before the disk cartridge is inserted into the cartridge holder and which is engaged with the shutter of the disk cartridge inserted into the cartridge holder.

A loading apparatus according to the present invention is a loading apparatus for a disk cartridge with an opening portion defined therein and which has a shutter freely slidable for opening and closing the opening portion. The loading apparatus includes a cartridge holder with a disk cartridge inserted thereto and holding the inserted disk cartridge, a rotation driving means for rotating the disk housed in the disk cartridge and a shutter releasing means engaged with the shutter of the disk cartridge inserted into the cartridge holder, wherein the rotation driving means includes a table disposed on one side across the cartridge holder and a holding member disposed on the other side for holding the disk housed in the disk cartridge together with the table. The shutter releasing means fully opens the opening portion of the disk cartridge with the shutter of the disk cartridge before the disk cartridge inserted into the cartridge holder reaches the rotation driving means, and releases an engagement between the disk cartridge and the shutter when the disk cartridge is further inserted into the cartridge holder.

A loading apparatus according to the present invention further includes a supporting means for supporting the disk cartridge shutter, opened by the shutter releasing means, at the position in which the opening portion of the disk cartridge is opened.

Further, the supporting means includes a restriction portion protruded from the cartridge holder to the inner surface of the cartridge holder so as to be engaged with the shutter of the disk cartridge.

Further, the cartridge holder comprises a rectangular major surface on which the shutter releasing means is provided and a pair of supporting portions disposed along a pair of opposed sides of the major surface for supporting the inserted disk cartridge. The holding member is protruded from the major surface of the cartridge holder to the inner surface of the cartridge holder and disposed rotatably in the cartridge holder.

A loading apparatus according to the present invention is a disk cartridge loading apparatus having an opening portion through which the housed disk is opposed to the outside and a shutter for opening and closing the opening portion and which includes a thin portion in correspondence with a position at which the shutter closes the opening portion. This loading apparatus includes a cartridge holder with the disk cartridge inserted thereto and supporting the inserted disk cartridge, a rotation driving means for rotating the disk housed in the disk cartridge and a shutter releasing means for opening the shutter of the disk cartridge inserted into the cartridge holder. The shutter releasing means moves the disk cartridge shutter to the position at which the thin portion of the disk cartridge is opened before the disk cartridge inserted into the cartridge holder reaches the rotation driving means.

A loading apparatus according to the present invention further includes a supporting means for supporting the disk cartridge shutter, opened by the shutter releasing means, at the position in which the opening portion of the disk cartridge is opened.

Further, the shutter releasing means includes an opening lever rotatably provided, engaged with the disk cartridge shutter to move the shutter in the direction in which the opening portion of the disk cartridge is opened and which is placed at the insertion mouth side of the disk cartridge under the condition that the disk cartridge is not yet inserted into the cartridge holder. When the disk cartridge is further inserted into the cartridge holder after the shutter of the disk cartridge inserted into the cartridge holder is moved by the opening lever so as to open the thin portion of the disk cartridge, an engagement between the opening lever and the disk cartridge shutter is released and the supporting means supports the shutter at the position in which the shutter opens the opening portion.

Further, the opening lever is formed as a substantially L-shaped lever. The opening lever is rotatably attached to the cartridge holder in such a manner that a base end of the opening lever is placed behind the direction in which the disk cartridge is inserted into the rotation driving means under the condition that a free end which is engaged with the disk cartridge shutter inserted into the cartridge holder is placed at the insertion mouth side of the cartridge holder.

In the disk cartridge loading apparatus according to the present invention, since the shutter is opened before the disk cartridge inserted into the cartridge holder reaches the holding members of the disk, a spacing between the holding members may be set to be a little larger than the thickness of the disk when the disk cartridge is loaded. Hence, the whole of the loading mechanism can be reduced in thickness.

Further, the shutter opening operation of the disk cartridge can be constantly carried out smoothly and the opened shutter can be reliably supported in the opened state.

BEST MODE FOR CARRYING OUT THE INVENTION

The present invention will be described below with reference to embodiments in which the present invention is applied to a disk player selectively using an optical disk in which information such as Japanese dictionary information or English-Japanese dictionary information are recorded and an optical disk in which a music signal is recorded as a recording medium and which has an optical disk reproducing function and a display function in which information read out and reproduced from the optical disk is displayed on a display portion as visible information.

Figure 10:
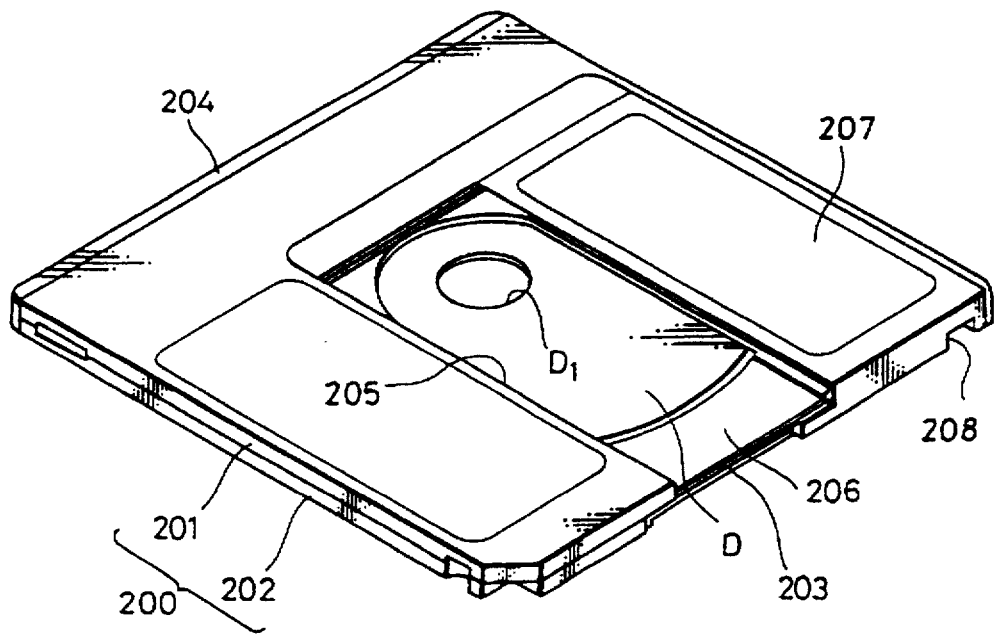
FIG. 10 is a front perspective view illustrating the disk cartridge with its shutter being opened.
Figure 11:
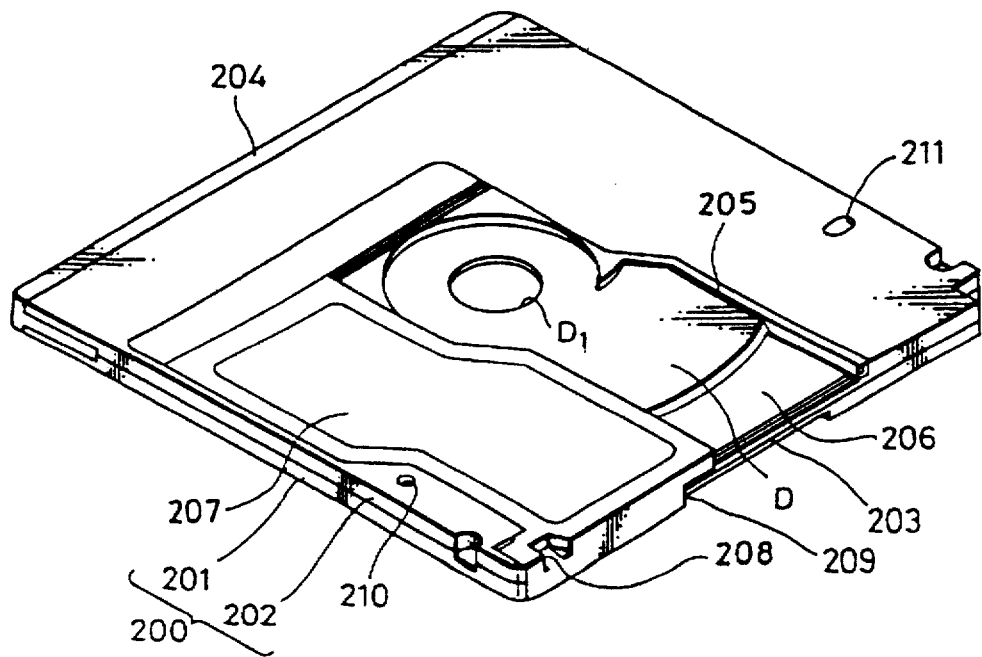
FIG. 11 is a rear perspective view illustrating the disk cartridge with its shutter being opened.

Initially, prior to the description of the disk player, a disk cartridge in which a disk is rotatably housed and which is loaded onto this disk player will be described with reference to FIGS. 10 and 11.

A disk cartridge 200 in which a disk D is rotatably housed is formed by fastening a pair of an upper half 201 and a lower half 202 of substantially box-shape with a space large enough to house the disk D. A guide portion 203 or shutter, which will be described later on, is provided on the front surface portion of the cartridge 200 and a lid 204 for inserting and ejecting the disk D is attached to the rear surface portion so as to become openable and closable.

The upper half 201 and the lower half 202 have an opening portion 205 defined from the central portion to the front surface portion, and the opening portion is large enough to expose the disk D from the circumference of a central aperture $D_1$ to a part of the radius direction to the outside. The front portions of the opening portion 205 are coupled by a thin portion 206 which results from forming the central front sides of the upper half 201 and the lower half 202 in a recess fashion.

A shutter 207 for opening and closing the two opening portions 205 are slidably attached to the disk cartridge 200. The shutter 207 is shaped as a deformed U-like shape in such a way as to cover the two opening portions 205 of the upper half 201 and the lower half 202. The shutter has on its front surface portion corresponding to the front surface of the disk cartridge 200 formed an engagement concave portion 208 into which a shutter opening member is fitted and engaged. The shutter has on its inner end portion formed a guide member 209 which is fitted and engaged into the shutter guide portion 203 of the front surface portion of the disk cartridge 200. A spring member (not shown) for constantly spring-biasing the shutter 207 in the direction in which the shutter closes the two opening portions 205 is interposed between the shutter 207 and the disk cartridge 200.

Further, cartridge positioning engagement apertures 210, 211 that are engaged with the cartridge positioning engagement protrusions (which will be described later on) are provided on both side portions of the lower surface of the lower half 202 at its portions near the front surface portion.

A thickness of the thin portion 206 of the front side portion of the opening portion 205 of the disk cartridge 200 is less than $1/3$ of the whole thickness.

Figure 2:
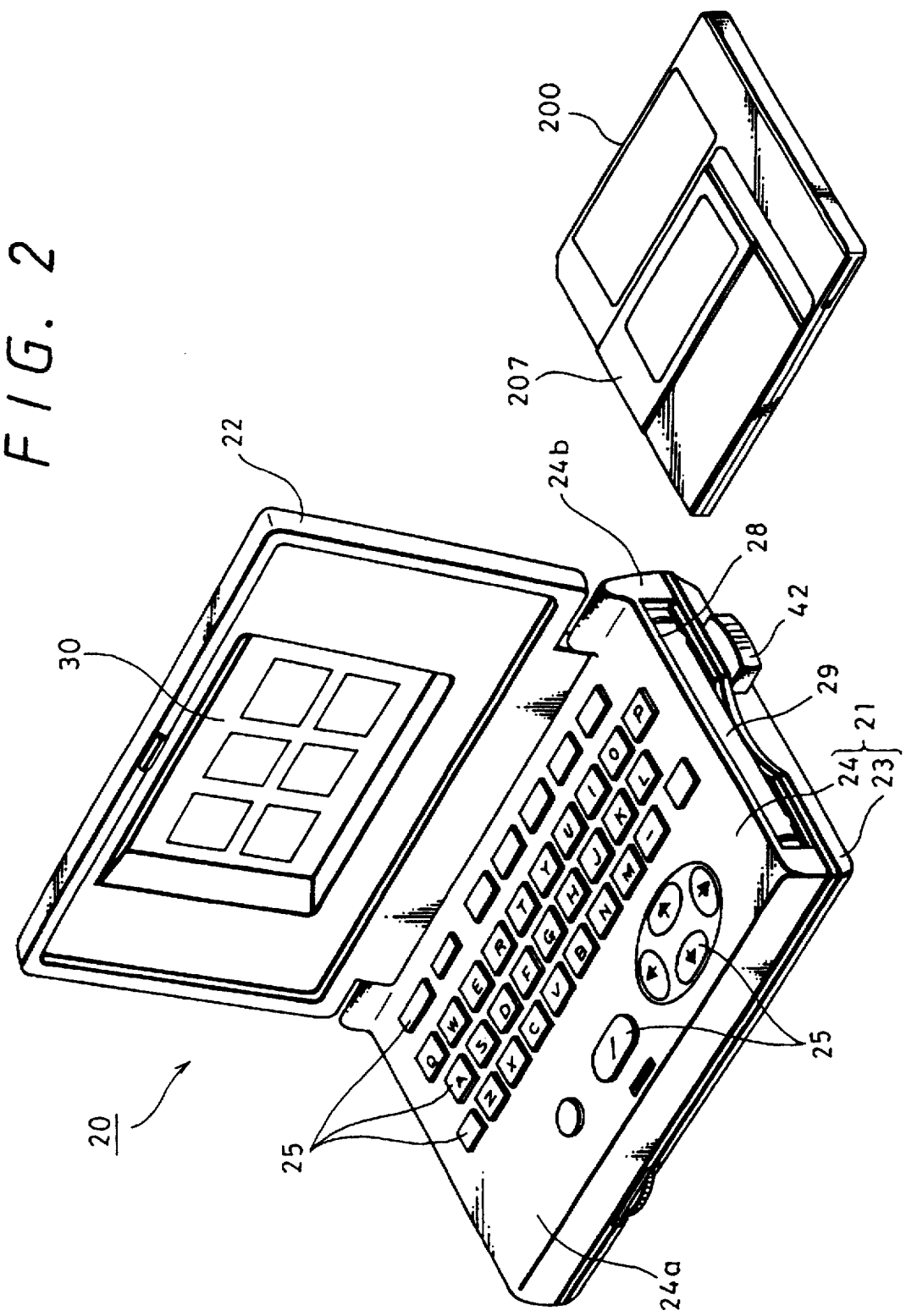
FIG. 2 is a perspective view of an example of a disk player to which the disk cartridge loading apparatus according to the present invention is applied.
Figure 4:
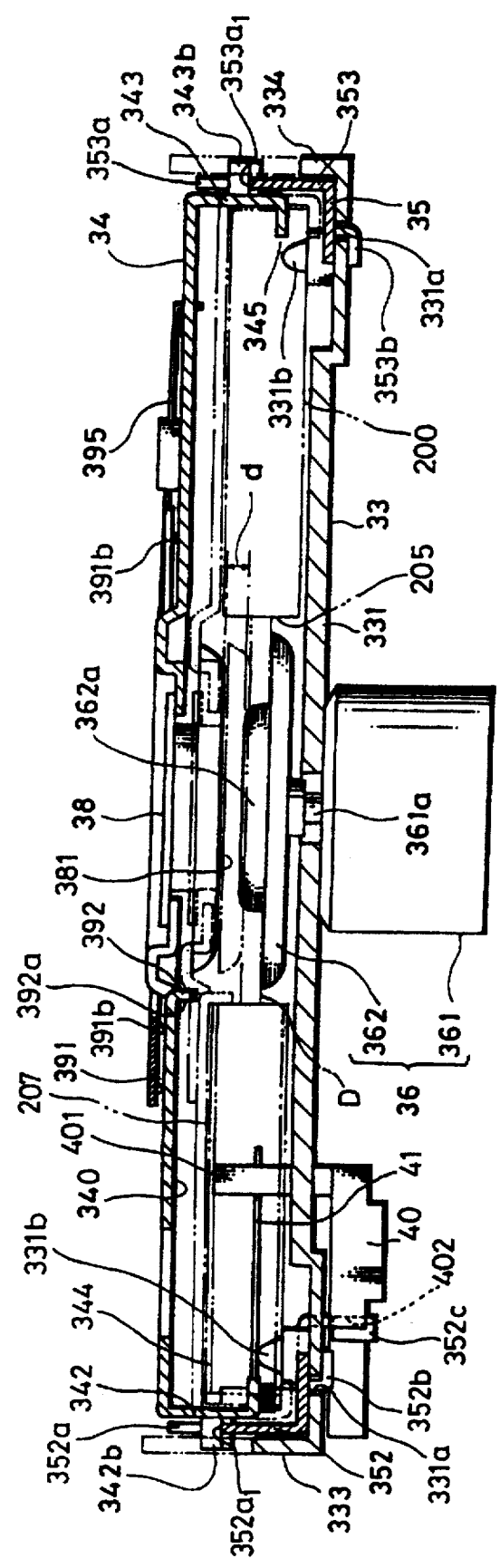
FIG. 4 is an enlarged central cross-sectional view of the disk cartridge loading apparatus shown in FIG. 1.
Figure 5:
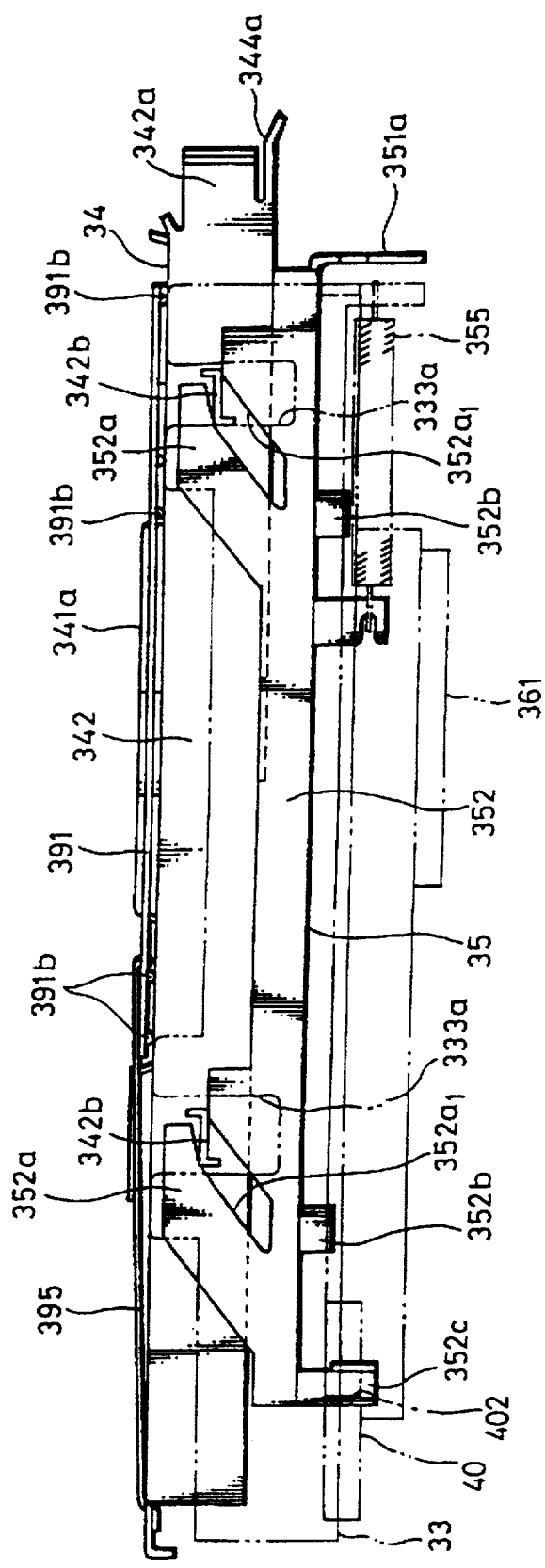
FIG. 5 is a partly-omitted side view of the disk cartridge loading apparatus shown in FIG. 1.
Figure 6:
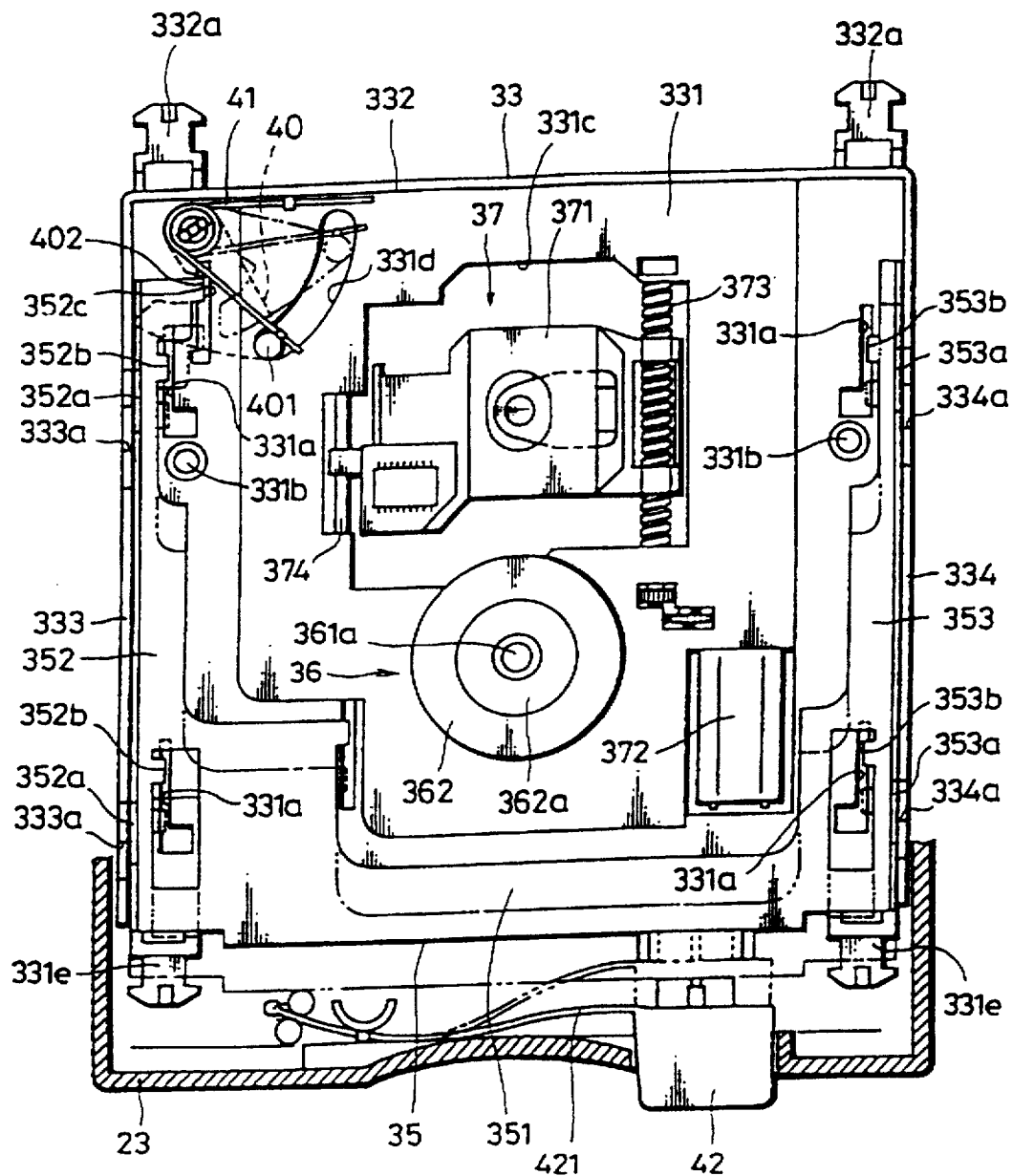
FIG. 6 is a plan view illustrating the disk cartridge loading apparatus shown in FIG. 1 with a cartridge holder being removed.
Figure 7:
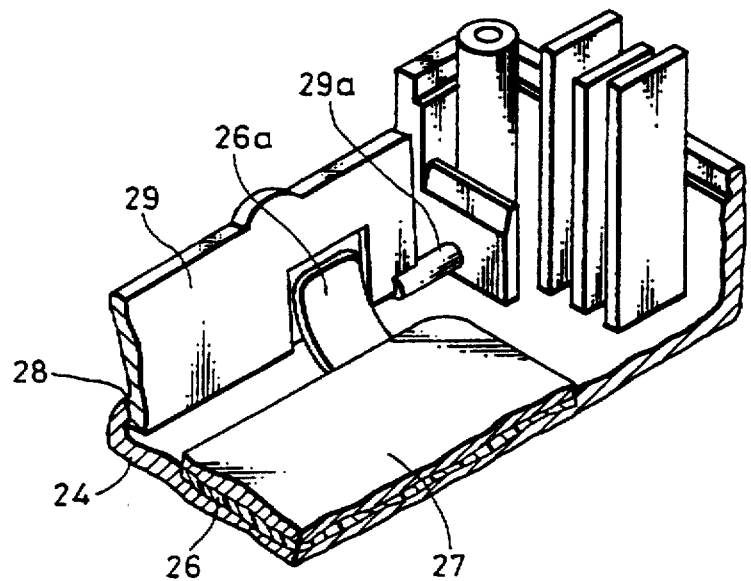
FIG. 7 is a perspective view illustrating the inside of a part of the disk player shown in FIG. 2.
Figure 8:
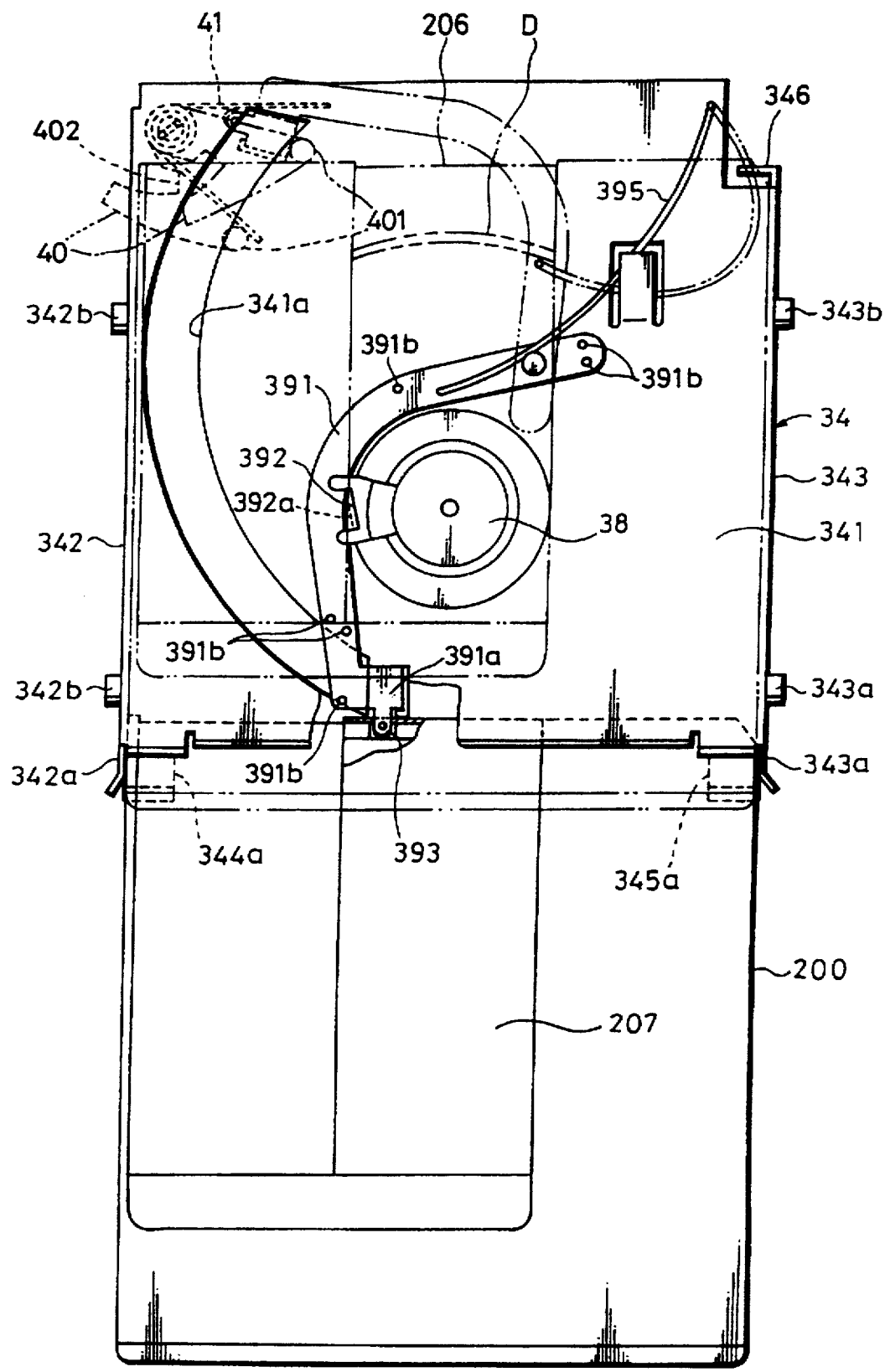
FIG. 8 is a fragmentary cutaway plan view of the disk cartridge loading apparatus shown in FIG. 1 and to which reference will be made in explaining a disk cartridge insertion operation.
Figure 9:
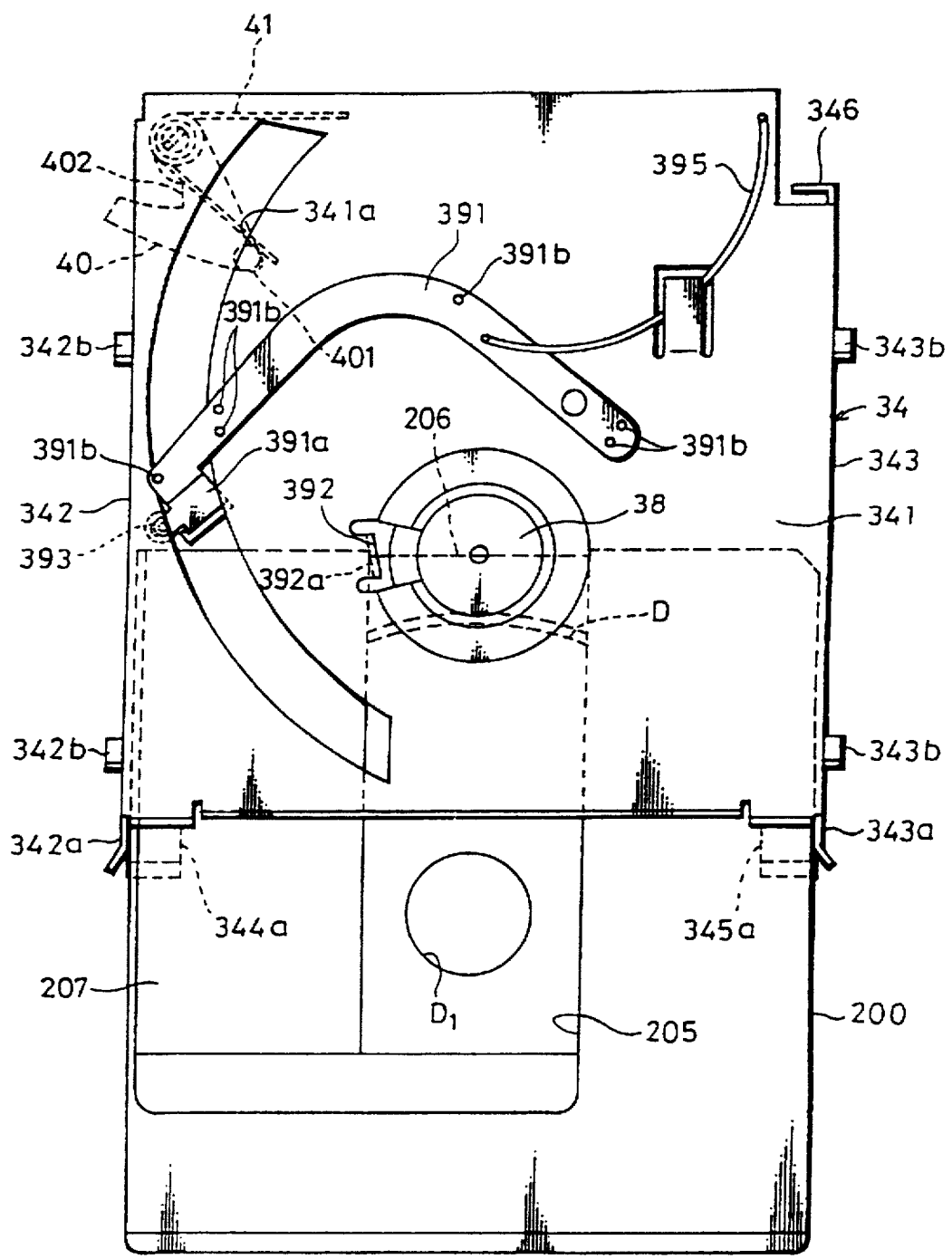
FIG. 9 is a plan view of the disk cartridge loading apparatus shown in FIG. 1 and to which reference will be made in explaining a disk cartridge insertion operation.

A disk player will be described with reference to FIGS. 2 and 4.

A disk player 20 comprises a body portion 21 and a lid portion 22. The body portion 21 is formed by fastening a rectangular box-shaped cabinet 23 in which a disk cartridge loading apparatus, which will be described later on, according to the present invention is incorporated and a rectangular box-shaped operation panel 24. The operation panel 24 has an operation portion on which there are arranged a number of operation keys 25 for controlling the reading of information signal of the optical disk loaded onto the disk apparatus and reading and reproducing desired information from the optical disk.

Figure 3:
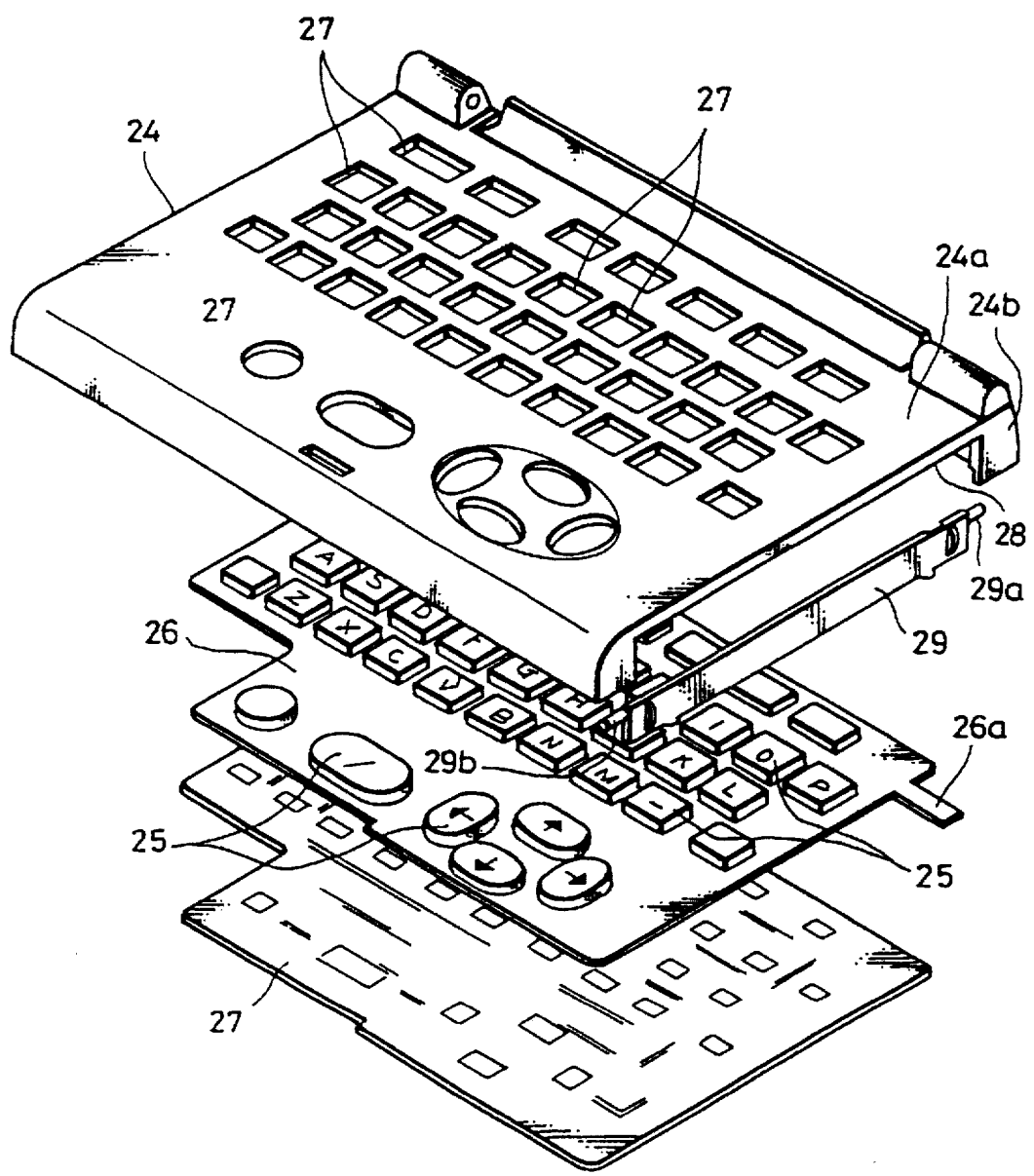
FIG. 3 is a fragmentary exploded perspective view of the disk player shown in FIG. 2.

As shown in FIG. 3, this operation portion comprises an operation key plate 26 in which a number of operation keys 25 flexibly displaced with application of pressure are integrally formed with a flexible plate such as a single rubber plate and a key switch attachment plate 27 formed of a printed circuit board on which a switch portion that is turned ON/OFF by pressing the operation key 25. The operation key plate 26 is disposed on the inside of the operation panel 24 and fitted into through-holes 27 defined on a surface portion 24a of the insertion panel 24, thereby protruded from the surface side by a predetermined height. The key switch attachment plate 27 is disposed in the inside of the surface portion 24a of the operation panel 24 in such a manner that it is overlaid under the operation key plate 26. The operation key plate 26 and the key switch attachment plate 27 are disposed on the inside of the operation panel 24.

The operation panel 24 has on its one side surface portion 24b defined a cartridge insertion mouth 28 of inverted-concave shape for loading a disk cartridge 200, which will be described later on, into a disk cartridge loading apparatus incorporated within the cabinet 23. A lid plate 29 with shafts 29a, 29b protruded from respective ends is pivotally supported to the cartridge insertion mouth 28 so as to be rotated inwardly. The lid plate 29 closes the cartridge insertion mouth 28 from the inside under the condition that the disk cartridge is not inserted into the cartridge insertion mouth.

In this embodiment, as a spring-biasing means for spring-biasing the lid plate 29 in the direction in which the lid plate closes the cartridge insertion mouth 28, a protruded member 26a is integrally protruded from one side edge portion of the operation key plate 26 formed of the flexible plate such as the rubber plate of the operation portion. This protruded portion 26a is brought in contact with the rear surface of the lid plate in a curved state with an angle of substantially 90° under the condition that the lid plate 29 covers the cartridge insertion mouth 28. This protruded member 26 can obtain a spring-biasing force in the direction in which the lid plate 29 constantly closes the cartridge insertion mouth 28.

A conventional disk cartridge loading apparatus in which a lid plate 17 pivotally supported to a mouth portion 15a of a housing 15 by shaft 16a, 16b is given a spring-biasing force of the closing direction by a torsion coil spring 18 wound around the shaft 16a has many assemblies. Further, the torsion coil spring 18 has to be attached with a torsion upon assembly such that it may generate a spring-biasing force under the condition that the lid plate 17 is completely closed, and it is poor in working property. However, according to the arrangement of this embodiment, the assemblies can be reduced and working property of the assembly process can be improved.

The protruded portion 26a protruded on the operation key plate 26 according to this embodiment is not limited to one pivot portion side of the lid plate 29 and may be formed in correspondence to an arbitrary position. Therefore, if the operation key plate is formed in correspondence with the central portion of the lid plate 29, then an equal spring-biasing force can be given to the two pivot portions with the result that the lid plate 29 can be opened and closed more smoothly.

The lid portion 22 has a display panel function to display information read out and reproduced from the optical disk as image information, and has a display portion 30 provided on the inner surface. The display portion 30 comprises a display panel formed of a liquid-crystal display device (LCD).

An example of the disk cartridge loading apparatus according to the present invention incorporated in the disk player will be described with reference to FIG. 1 and FIGS. 4 to 9.

Figure 1:
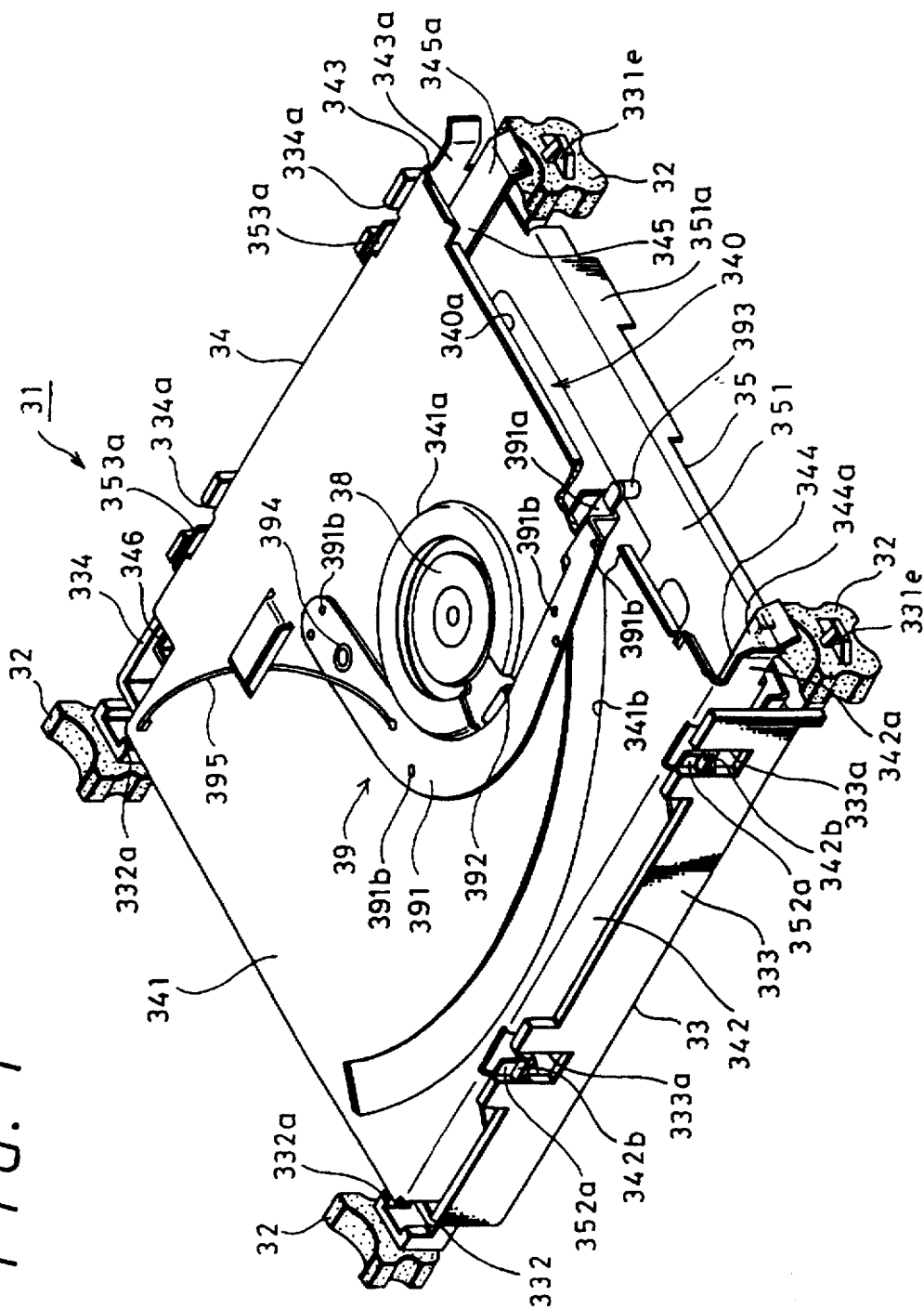
FIG. 1 is a perspective view illustrating a disk cartridge loading apparatus according to an embodiment of the present invention in a partly cutaway fashion.

In FIG. 1, reference numeral 31 generally depicts a disk cartridge loading apparatus which comprises a main chassis 33 attached in a plate-fashion between the cabinet 23 of the body unit 21 of the disk player 20 and the operation panel 24 through a vibration-isolation member 32, a cartridge holder 34 supported to the main chassis 33 so as to contact with and come away from a base plate surface portion 331, a slider 35 supported on the base plate surface portion 331 of the main chassis 33 so as to become slidable back and forth and causing the cartridge holder 34 to be contacted with and come away from the base plate surface portion 331 of the main chassis 33 in accordance with the slide operation thereof, a disk rotation drive mechanism 36, an optical pickup device 37, a disk clamper 38 and a shutter opening mechanism 39 for opening a shutter 207 of the disk cartridge 200.

As shown in FIG. 1 and FIGS. 4 to 6, the main chassis 33 has erected surface portions 332, 333, 334 formed ROM the rear edge portion to the two side edge portions of the base plate surface portion 331. The base plate surface portion 331 has at its substantially central portion provided the disk rotation driving mechanism 36 and the optical pickup device 37. The base plate surface portion further includes on its front and rear portions of the two side portion surfaces defined guide grooves 331a for the slider 35 in the front and rear direction. Engagement protrusions 331b, 331b for positioning the disk cartridge 200 are protruded from the second half portions of the two side portion surfaces.

The disk rotation driving mechanism 36 attached to the base plate surface portion 331 of the main chassis 33 comprises a spindle motor 361 and a turntable 362. The spindle motor 361 is attached to the lower surface such that a spindle 361a is protruded from the upper surface side of the base plate surface portion 331. The turntable 362 is fixed to the tip end of the spindle 361 protruded onto the upper surface of the base plate surface portion 331. The turntable 362 has at its central portion provided a centering portion 362a made of a magnetic material engaged with the central aperture of the disk to cause the rotation center of the turntable and the center of the disk to be agreed with each other.

In the optical pickup device 37 attached to the base plate surface portion 331 of the main chassis 33, the optical pickup 371 is opposed to an opening portion 331c defined at the central latter half portion of the base plate surface portion 331 from the lower surface side. The optical pickup 371 is supported by a feed screw 373 rotated by a pickup feeding motor 371 attached to the lower surface of the base plate surface portion 331 and a slide guide rail 374 formed on one side edge portion of the opening portion 331c. The optical pickup 371 of the optical pickup device 37 is linearly moved within the opening portion 331c relative to the diametrical portion of the disk on the turntable 362 when the feed screw 372 is rotated by the pickup feed motor 372.

A locking member 40 for locking the slider 35 is provided on the base plate surface portion 331 of the main chassis 31 at its lower surface side of one side rear portion. The locking member 40 is formed as substantially L-shaped lock member. An engagement pin 401 is implanted on the bent portion of the locking member 40, and one end of the engagement pin is pivoted to the lower surface of the base plate surface portion 331. The engagement pin 401 is protruded to the upper surface side from an arc-like guide opening 331s defined at the center of the pivot portion of the base plate surface portion 331 and thus the engagement pin is constantly rotated in the forward direction under spring force of the torsion spring 41.

On the other hand, the two side erected surface portions 333, 334 of the main chassis 33 have at their front rear portions formed guide grooves 333a, 334a in the upper and lower direction, i.e., in the direction vertical to the base plate surface portion 331. Arm portions 332a, 331e for attaching the vibration-isolation member 32 are protruded from the rear respective side portions of the rear erected surface portion 332 and the front respective side portions of the base plate surface portion 331 and to which the vibration-isolation members 32 are fitted.

The cartridge holder 34 comprises an overhead plate surface portion 341 of square shape narrower than the base plate surface portion 331 of the main chassis 33 and side surface portions 342 and 343 bent downwardly at both sides of the overhead plate surface portion 341 in an opposing relation to each other. Supporting surface portions 344 and 345 are protruded from lower edges of the first half portions of the two side surface portions 342 and 343 horizontally in the inner direction, i.e., in parallel to the overhead plate surface portion 341. The overhead plate surface portion 341, the two side surface portions 342, 343 and the supporting surface portions 344, 345 constitute the supporting portion 340 which holds the disk cartridge so as to be freely inserted and ejected. The holding portion 340 has on its front surface side formed the disk cartridge insertion mouth 340a. Front edges of the supporting surface portions 344, 345 of the two side surface portions 342, 343 are respectively extended in the forward direction and bent outwardly to form guide portions 342a, 343a and 344a, 345a. The other side surface portion 343 has at its rear end portion formed a disk cartridge engagement portion 346 bent toward the inside.

Erected engagement members 342b, 343b that are engaged with the vertical guide grooves 333a, 334a of the two side surface portions 333, 334 of the main chassis 33 are formed on the front and rear portions of the two side surface portions 342, 343 of the cartridge holder 34. The front edges of the engagement members 342b, 343b are bent upwardly and the rear edges thereof are bent downwardly in order to enlarge engagement contact areas for the vertical guide grooves 333a, 334a.

The overhead plate surface portion 341 of the cartridge holder 34 supports the disk damper 38 serving as the holding member constructing the chucking portion in response to the turntable 362 such that the disk clamper can be swung and moved in the upper and lower direction. The supporting portion of the disk damper 38 is surrounded by an arc-shaped upheaved rib 341a. The disk damper 38 has on its disk contact surface 381 side attached a magnet which is magnetically attracted to the centering portion 362a, made of a magnetic material, of the turntable 362.

The square overhead plate surface portion 341 of the cartridge holder 34 has the shutter opening mechanism 39. The shutter opening mechanism 39 comprises a shutter opening arm 391 rotating on the upper surface portion of the overhead plate surface portion 341 from the front to rear end portions and a shutter opening holding portion 392 serving as the shutter opening means.

The shutter opening arm 391 is formed as substantially an L-shaped plate with a thickness smaller than the height of the arc-shaped upheaved rib 341 of the overhead plate surface portion 341. The tip end portion of the shutter opening arm is downwardly bent as substantially U-letter shape to form a contact portion 391a. An engagement roller 393 is attached to the lower surface side of the tip end of the contact portion 391a. Small protrusions 391b are protruded from the lower surfaces of the base end portion, the middle portion and the tip end portion of the releasing arm 391. The releasing arm 391 is supported to the upper surface of the overhead plate surface portion 341 in a point-contact fashion such that the base end portion is pivotally supported to the supporting portion of the disk damper 38 by a shaft ring 394 behind the disk cartridge insertion direction, i.e., at the position behind the arc-like upheaved rib 341a and that the small protrusions 391b formed on the lower surface are contacted with the upper surface of the overhead plate surface portion 341.

A tip end contact portion 391a including an engagement roller 393 disposed at the tip end of the releasing arm 391 is inserted into an arc-like opening groove 341b formed around the pivot portion on one side portion of the overhead plate surface portion 341 from the front end portion to the rear end portion and opposed to the lower surface side of the overhead plate surface portion 341, i.e., into the supporting portion 340 of the disk cartridge, whereby the releasing arm is constantly spring-biased in the forward direction under spring force of a torsion spring 395.

The shutter releasing and supporting portion 392 is formed as an erecting member on the overhead plate surface portion 341 of the cartridge holder 34 on the side opposing the arc-like open groove 341b of the supporting portion of the disk damper 38. This erecting member is opposed to the upper surface side of the thin portion 206 formed at the front central side of the disk cartridge 200 inserted into the cartridge holder 34. The erecting member is formed as a restriction surface 392a of a height which does not contact with the upper surface of the thin portion and which is inclined in the direction substantially perpendicular to the cartridge insertion mouth 340a, i.e., in the direction substantially perpendicular to the opening and closing direction of the shutter 207 of the disk cartridge 200 in such a manner that a spacing between it and the one side surface of the cartridge holder 34 is extended toward the direction of the cartridge insertion mouth 340a.

The slider 35 comprises a front surface portion 351 of the same width as the spacing between both side surface portions 342, 343 and the two side surface portions 352, 353 continuing the front surface portion 351. The front surface portion 351 has a pressing surface portion 351a which is downwardly bent from the front edge of the front surface portion. The two side surface portions 352, 353 have at its front and rear outer side edge portions erected guide surface portions 352a, 353a with guide cam grooves with large inclination angles in the forward direction so as to be engaged with engagement members 342a, 343a of the cartridge holder 34. Engagement members 352b, 353b that are slidably engaged with the base plate surface portion 331 of the main chassis 34 in the front and rear direction are downwardly bent from the two side surface portions 352, 353. An engagement member 352c that is engaged with a locking portion 402 of the locking member 40 is downwardly bent from the rear end of the one side surface portion 352.

Then, the slider 35 is constantly spring-biased relative to the main chassis 34 in the forward direction under spring force of a tension coil spring 355. Under the condition that the slider is slid against the spring-biasing force, the engagement member 352c is engaged with the locking portion 402 of the locking member 40.

The pressing surface portion 351a of the slider 35 is opposed to an eject button 42 disposed on the cabinet 23 of the body portion 21 of the disk player 20. The eject button 42 is resiliently returned by a resilient member 421 integrally formed therewith and a supporting point position of the resilient member 421 relative to the cabinet 23 is displaced, whereby the eject button 42 is slid in the straight line direction.

An operation of the loading apparatus 31 for the disk cartridge will be described.

Initially, under the condition that the disk cartridge 200 is not yet inserted into the supporting portion 340 of the cartridge holder 34, the slider 35 is slid backward against the spring-biasing force of the tension coil spring 355 and locked by the locking member 40 through the engagement member 352c at the position behind the main chassis 33, whereby the high portions of the inclined guide cam grooves 352$a_1$, 353$a_1$, of the guide surface portions 352a, 353a of the slider 35 are slidably contacted with the engagement members 342b, 343b. Thus, the cartridge holder 34 is located at the raised position along the vertical guide grooves 333a, 334a of the main chassis 33, i.e., at the elevated position.

In this state, the disk contact surface 381 of the disk damper 38 supported to the overhead plate surface portion 341 of the cartridge holder 34 is opposed to the centering portion 362a of the turntable 362 of the disk rotation driving mechanism 36 provided on the main chassis 33 side with a spacing d (see FIG. 4) which is equal to or slightly larger than the thickness of the thin portion 206 formed at the front central portion of the disk cartridge 200. The engagement pin 401 of the locking member 40 protruded from the base plate surface 331 of the main chassis 33 is opposed from its rear end portion to front side to the inside of the supporting portion 340.

Under this state, the shutter releasing arm 391 of the shutter releasing mechanism 39 disposed on the cartridge holder 34 is spring-biased in the forward direction under spring force of the torsion spring 395, whereby the tip end contact portion 391a is opposed to the cartridge insertion mouth 340a of the supporting portion 340 in a crossing fashion and the engagement roller 393 is protruded to the front end of the cartridge insertion mouth 340a.

In order to load the disk cartridge 200 by this loading apparatus 31, when the front surface side of the disk cartridge 200 is opposed to the cartridge insertion mouth portion 340a of the supporting portion 340 of the cartridge holder 34 along the guide portions 342a, 343a and 344a, 345a, the engagement recess 208 formed at the front surface of the shutter 207 is engaged with the engagement roller 393 of the shutter releasing arm 391. By this engagement, the locking member of the shutter 207 is pressed and the shutter 207 is released from the locked state.

Under this state, if the disk cartridge 200 is pushed into the supporting portion 340 of the cartridge holder 34, then the shutter releasing arm 391 is rotated backward about the pivot portion of the shaft ring 394 against the spring-biasing force of the torsion spring 395 under the condition that the engagement roller 393 is still engaged with the engagement recess 208 of the shutter 207. In accordance with the rotation of the shutter releasing arm, the shutter 207 is pressed in the direction of one side portion through the engagement portion between the engagement recess 208 and the engagement roller 393 and starts being opened. The shutter releasing arm 391 can be smoothly rotated due to a small coefficient of friction because the small protrusions 391b are protruded on the upper surface of the overhead plate surface portion 341 of the cartridge holder 34 in a point contact fashion.

Under this state, the disk cartridge 200 is further inserted into the supporting portion 340 to rotate the shutter releasing arm 391 much more, whereby the shutter 207 is opened largely. Under this state, the thin portion 206 formed at the front central portion of the disk cartridge 200 is opposed to the spacing portion between the disk contact surface 381 of the disk damper 38 and the centering portion 362a of the turntable 362. Then, when the disk cartridge 200 is further pushed into the supporting portion and the shutter releasing arm 391 is rotated up to the intermediate position shown in FIG. 9, the shutter 207 is opened completely.

In this manner, the inside end edge of the front surface portion of the shutter 207 is slidably contacted with the shutter releasing supporting portion 392 of the cartridge holder 34 and the perfectly-opened state is maintained so that the shutter is escaped from the disk damper 38 and the turntable 362. Therefore, the thin portion 206 formed at the central front portion of the disk cartridge 200 is wholly exposed and inserted into the spacing portion between the disk contact surface 381 of the disk damper 38 and the centering portion 362a of the turntable 362. On the other hand, although the front surface of the disk cartridge 200, i.e., the front surface of the opened shutter 207 is brought in contact with the tip end contact portion 391a and pressed and rotated so that the engagement roller 393 is disengaged from the engagement recess 208 of the shutter 207, the released state of the shutter 207 is maintained by the shutter releasing supporting portion 392, and hence the shutter releasing arm 391 can be prevented from being closed.

When the disk cartridge 200 is further inserted into the supporting portion 340, the inside end edge of the shutter 207 is slidably contacted with the shutter releasing support portion 392 and the released state of the shutter 207 is maintained, and the shutter releasing arm 391 also is rotated rearwardly under the condition that it is brought in contact with the front surface of the shutter 207.

As described above, when the disk cartridge 200 is inserted into the rear portion of the supporting portion 340 of the cartridge holder 34, the front surface, i.e., the front surface of the released shutter 207 is protruded from the base plate surface portion 331 of the main chassis 33 and urged against the engagement pin 401 of the locking member 40 opposed to the inside of the supporting portion 340 of the cartridge holder 34, whereby the locking member 40 is rotated rearwardly against the spring-biasing force of the torsion spring 41.

Then, when the disk cartridge 200 is inserted into the rear end of the supporting portion 340 of the cartridge holder 34, i.e., inserted into the end of the engagement portion 346 (state shown by a two-dot-dash line in FIG. 8), the locking member 40 is rotated to the rear end of the main chassis 33 through the engagement pin 401 (state shown by a two-dot-dash line in FIG. 6), whereby the locking portion 402 is disengaged from the engagement member 352c of the slider 35, thereby unlocking the shutter. In this state, the end face of the free end of the locking member 40 abuts against the inner side surface of the engagement member 352c and thereby the locking member is prevented from being rotated. Thus, the slider 35 is resiliently slid on the main chassis 33 in the forward direction under spring force of the tension coil spring 355.

When the slider 35 is slid in the forward direction, the high portions to the low portions of the inclined guide cam grooves $352a_1$, $353a_1$ of the guide surface portions 352a, 353a are displaced and slid along the engagement members 342b, 343b of the two side surface portions 342, 343, whereby the cartridge holder 34 is vertically lowered along the vertical guide grooves 333a, 334a of the main chassis 33. Accordingly, the disk cartridge 200 in which the shutter 207 is inserted into the supporting portion 340 also is lowered in unison with the cartridge holder so that the positioning engagement apertures 210, 211 are engaged with the positioning engagement protrusions 331b, 331b formed on the base plate surface portion 331 of the main chassis 33 and thereby properly positioned. Then, through the opened open groove portion 205, the disk D is placed on the turntable 362 of the disk rotation driving mechanism 36 with the central aperture $D_1$ fitted into the centering portion 362a and the disk clamper 38 is brought in contact with the upper surface of the disk. Then, the disk clamper is urged against the upper surface of the disk by a magnetic attraction force acting between the magnet attached to the disk clamper 38 and the centering portion 362a of the turntable 362, whereby the disk D is chucked on the turntable 362 under the condition that the disk is distant from the upper and lower inner surfaces of the disk cartridge 200. Thus, the loading is ended.

Under this state, the disk rotation driving mechanism 36 and the optical pickup device 37 are energized, and the disk D is reproduced.

When the disk D is unloaded after it has been reproduced, if the slider 35 is slid rearwardly against the spring-biasing force by pressing the pressing surface portion 351a of the front end of the slider 35 slid in the forward direction, then the low portions to the high portions of the inclined guide cam groove 352$a_1$ and 353$a_1$ of the slider 35 are displaced and slid along the engagement members 342b, 343b, whereby the cartridge holder 34 is elevated along the vertical guide grooves 333a, 334a of the main chassis 33 and the disk cartridge 200 also is elevated in unison with the cartridge holder. Then, an engagement between the positioning engagement apertures 210, 211 and the positioning protrusions 331b, 331b formed on the base plate surface portion 331 of the main chassis 33 is released and the disk D is set on the lower inside surface of the disk cartridge 200. As a consequence, the disk is floated from the turntable 362 and the center aperture is upwardly disengaged from the centering portion 362a, and the upper surface side of the disk D is disengaged from the disk contact surface 381 of the disk clamper 38.

In this state, the centering portion 362a of the turntable 362 and the disk contact surface 381 of the disk clamper 38 are opposed to each other with the spacing d (see FIG. 4) a little larger than the thickness of the thin portion 206 formed at the central front side portion of the disk cartridge 200 as mentioned before.

As described above, if the slider 35 is slid rearwardly against the spring-biasing force of the tension coil spring 355, then the engagement member 352c is backwardly disengaged from the end face of the free end of the locking member 40, whereby the locking member 40 is rotated in the forward direction to urge the locking member 402 to be engaged with the engagement member 352c, whereby the slider 35 is locked under the condition that the slider is slid in the backward direction. Also, when the locking member 40 is resiliently rotated, the engagement pin 401 presses the front surface of the cartridge 200 inserted into and held in the cartridge holder 34 that is elevated, i.e., the front surface of the shutter 207 that is placed in the opened state.

As a result, the disk cartridge 200 is resiliently pressed by a multiplied force of a spring force and a pressing force of the shutter releasing arm 391 that is returned and rotated in the forward direction under spring force of the torsion spring 395 and thereby pushed such that substantially the latter half portion is protruded from the cartridge insertion mouth 340a of the cartridge holder 34. Under this state, the disk cartridge 200 is extracted from the supporting portion 340 of the cartridge holder 34, thus the unloading is ended. When the disk cartridge 200 is extracted from the cartridge holder 34, if the shutter 207 is disengaged from the shutter releasing supporting portion 392 in the forward direction, the shutter is automatically closed under spring force of a spring incorporated therein.

This unloading operation is carried out a second by pressing the pressing surface portion 351a of the slider 35.

In the loading/unloading operation of the disk cartridge 200, the rotation of the shutter releasing arm 391 is carried out when the small protrusions 391b formed on the releasing arm 391 are slidably contacted with the upper surface of the overhead plate surface portion 341 of the cartridge holder 34. Therefore, a frictional resistance is small and the loading/unloading operation can be carried out without a noisy sound.

Further, when the disk cartridge 200 is inserted into the cartridge holder 34, if the shutter 207 and the shutter releasing arm 391 are not engaged with each other, i.e., the engagement recess 208 and the engagement roller 393 are not engaged with each other, the engagement roller 393 is rotatably contacted with the front surface of the disk cartridge 200, whereby the shutter releasing arm 391 is pressed and rotated in the rearward under the condition that the shutter releasing arm runs idle. However, since the thin portion 206 formed at the front central portion of the disk cartridge 200 is covered with the shutter 207, the front surface of the shutter 207 abuts against the disk clamper 38 positioned within the supporting portion 340 of the cartridge holder 34, thereby preventing the disk cartridge from being inserted into the cartridge holder excessively. Thus, a malfunction of the apparatus can be prevented, and there is then no risk that the disk rotation driving mechanism 36, the optical pickup device 37 or the like are damaged.

Further, when the disk cartridge 200 is inserted into the cartridge holder 34 in the opposite direction, i.e., from the rear surface side, similarly as described above, the engagement roller 393 of the shutter releasing arm 391 is rotatably contacted with the rear surface of the disk cartridge 200 so that the shutter releasing arm 391 is rotated under the condition that the shutter releasing arm runs idle. However, the rear surface of the disk cartridge 200 abuts against the disk damper 38, whereby the disk cartridge can be prevented from being inserted into the cartridge holder excessively. Therefore, the disk cartridge can be prevented from being inserted into the cartridge holder by mistake.

Figure 12:
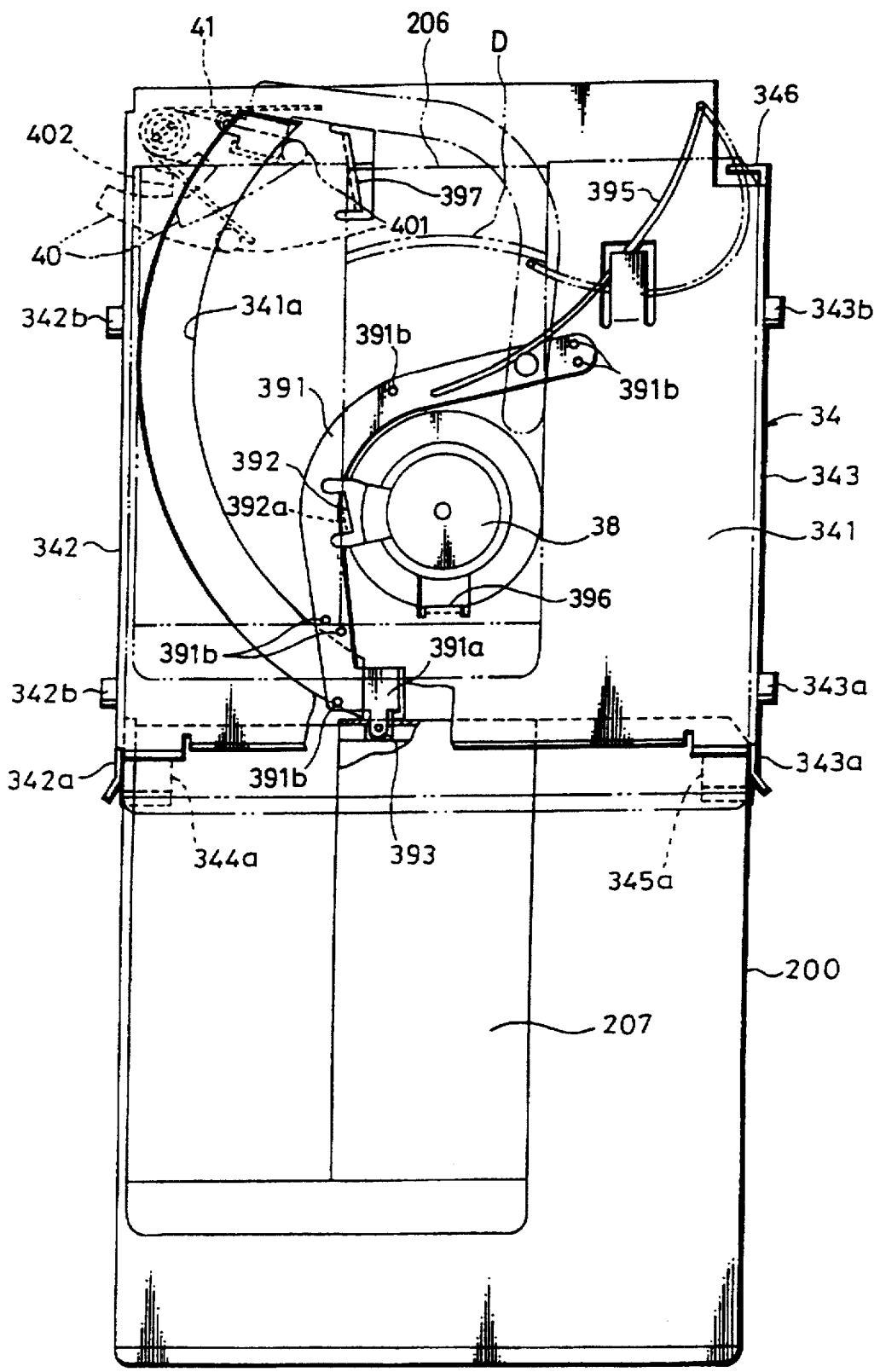
FIG. 12 is a plan view illustrating a disk cartridge loading apparatus according to another embodiment of the present invention and to which reference will be made in explaining a disk cartridge insertion operation.
Figure 13:
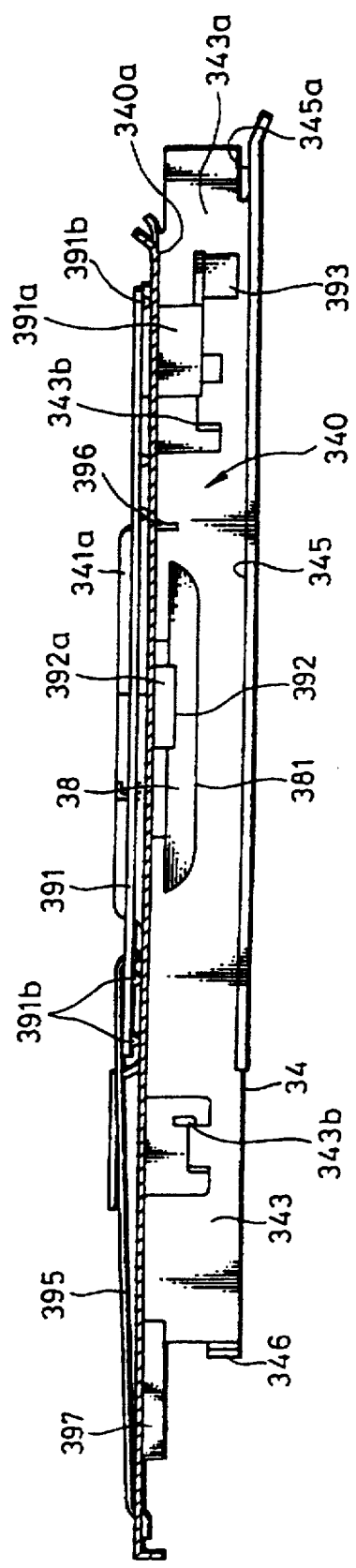
FIG. 13 is an enlarged longitudinal cross-sectional view of a cartridge holder of the disk cartridge loading apparatus shown in FIG. 12.
Figure 14:
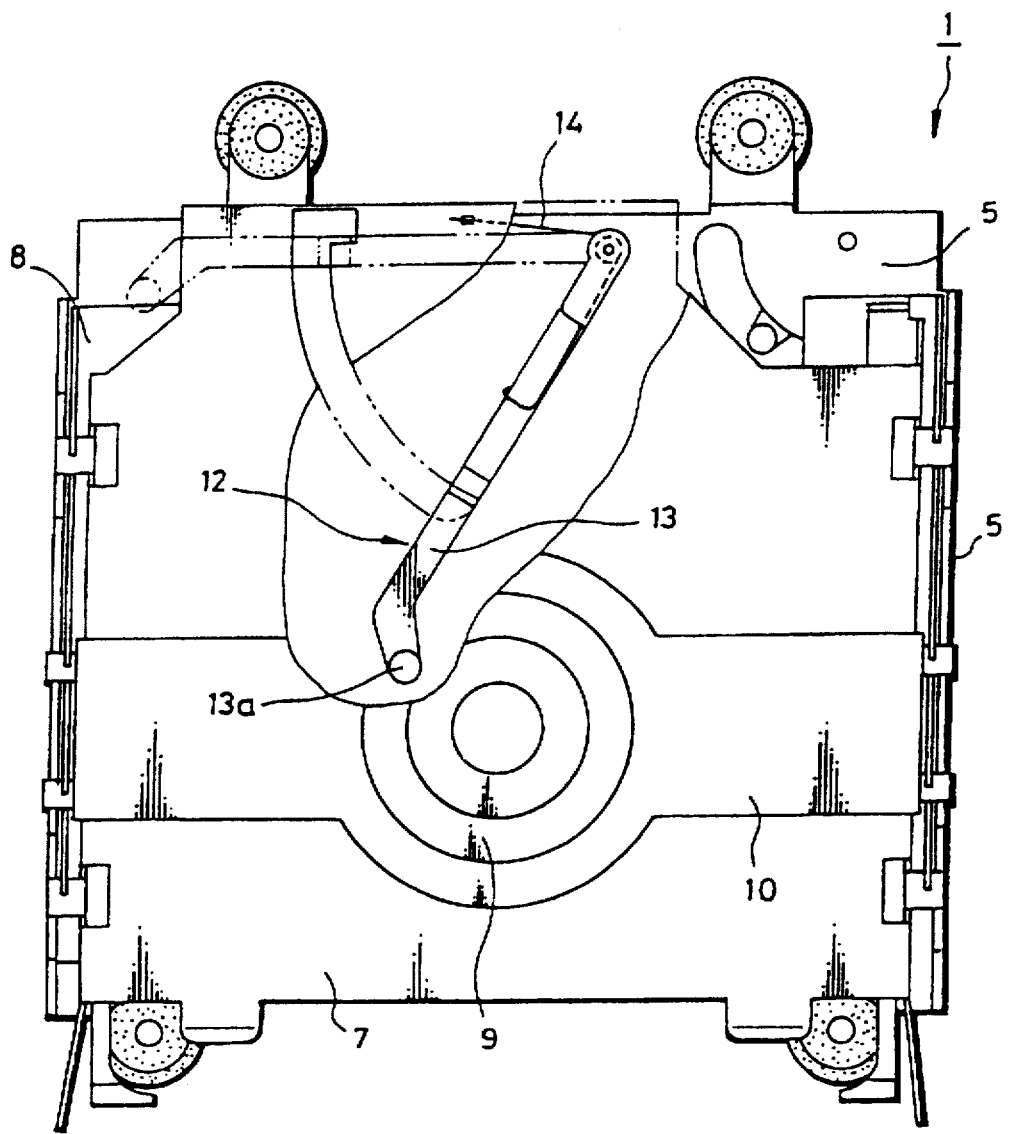
FIG. 14 is a fragmentary cutaway plan view of a conventional disk cartridge loading apparatus.
Figure 15:
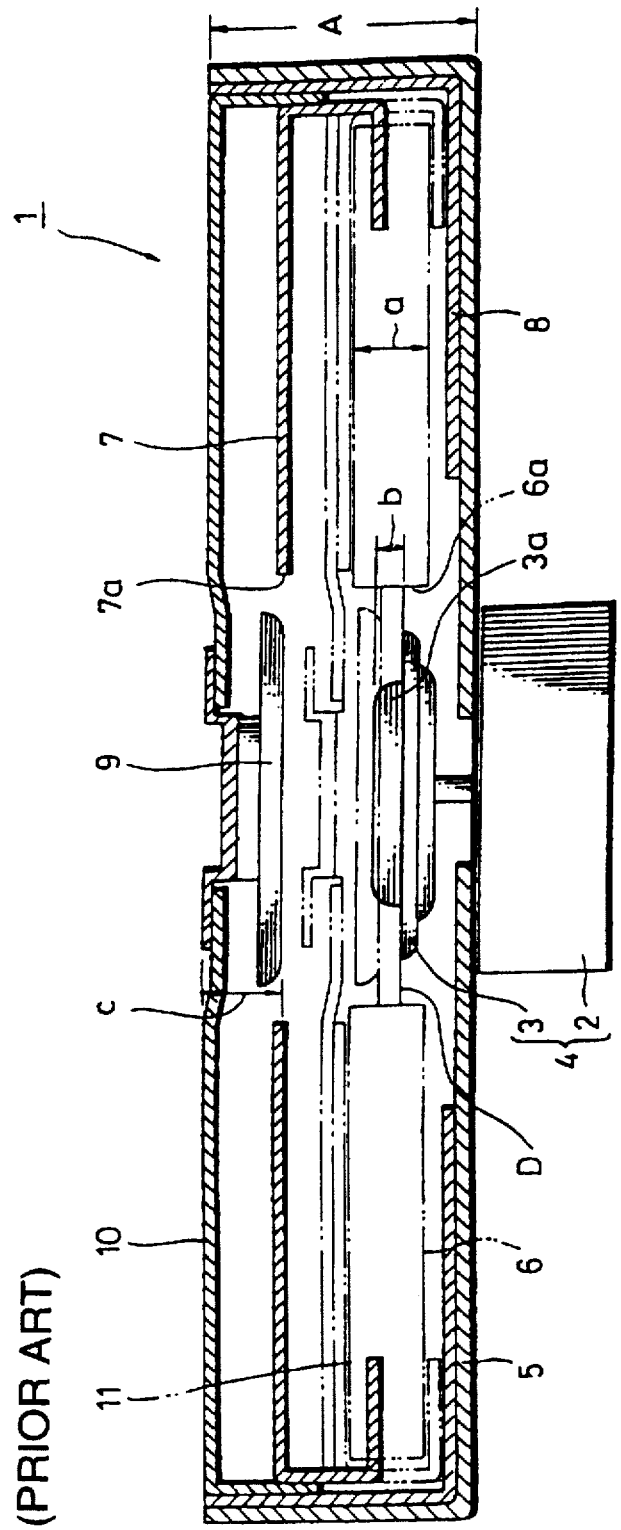
FIG. 15 is an enlarged central cross-sectional view of the disk cartridge loading apparatus shown in FIG. 14.
Figure 16:
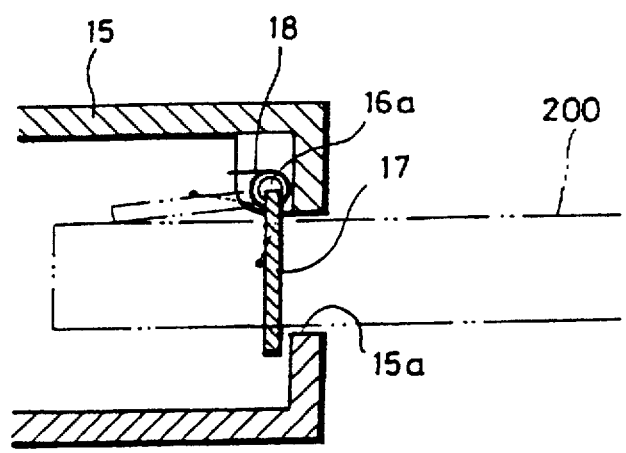
FIG. 16 is a cross-sectional view of a disk cartridge insertion portion of the conventional disk player.
Figure 17:
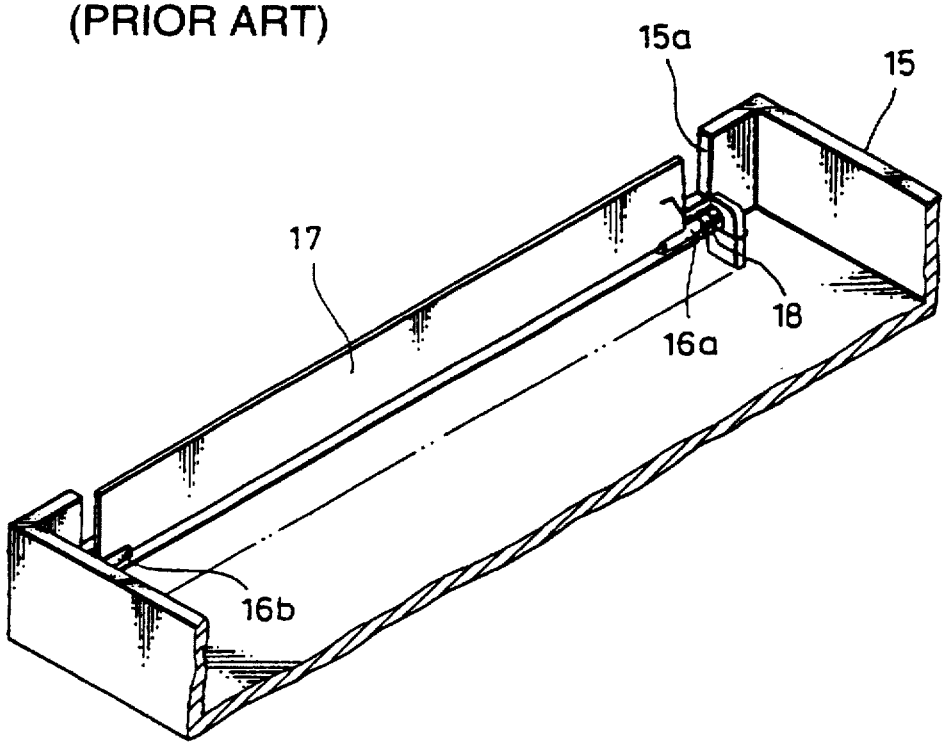
FIG. 17 is an inside perspective view of an insertion portion of the disk cartridge shown in FIG. 16.

Although the disk cartridge 200 can be reliably prevented from being inserted into the cartridge holder 34 by mistake as described above, if the cartridge holder 34 is modified according to another example as shown in FIGS. 12 and 13, then it is possible to prevent more reliably the disk cartridge 200 from being inserted into the cartridge holder by mistake.

In the case of the example shown in FIGS. 12 and 13, a cartridge mis-insertion preventing portion 396 is formed on the overhead plate surface portion 341 of the cartridge holder 34 at the position ahead of the supporting portion of the disk damper 38. Similarly to the aforesaid shutter releasing supporting portion 392, this cartridge mis-insertion preventing portion 396 is formed as a downward erected member opposing the upper surface side of the thin portion 206 formed at the central front side of the disk cartridge 200 and which is opposed to the cartridge insertion mouth portion 340a with such a proper height as not to contact with the upper surface.

Since the cartridge mis-insertion preventing portion 396 is formed on the cartridge holder 34 at the front side of the supporting portion of the disk clamper 38 in an opposing relation to the cartridge insertion mouth portion 340a, in the regular insertion operation in which the disk cartridge 200 is inserted into the cartridge holder 200 while the shutter 207 is being opened, the thin portion 206 formed at the central front portion of the cartridge holder 34 is passed under the cartridge mis-insertion preventing portion 396 and moved toward the disk damper 38. However, in the state that the shutter 207 is not released, the front surface of the shutter 207 abuts against the cartridge mis-insertion preventing portion 396 and thereby the disk cartridge can be prevented from being inserted into the cartridge holder excessively. Therefore, the disk damper 38 can be protected and a mal-function of the apparatus can be prevented.

Further, when the disk cartridge 200 is inserted into the cartridge holder 34 in the opposite direction, the rear surface of the disk cartridge abuts against the cartridge mis-insertion preventing portion 396. Thus, the disk cartridge can be prevented from being inserted into the cartridge holder and thereby prevented from being inserted into the cartridge holder by mistake.

As described above, in the case of this example, since the disk cartridge 200 can be prevented from being inserted into the cartridge holder by mistake by the cartridge misinsertion preventing portion 396 integrally formed with the cartridge holder 34, when the disk cartridge 200 is rapidly and strongly inserted into the cartridge holder, the disc cartridge can be reliably prevented from being inserted into the cartridge holder by mistake without damaging other members.

In the case of this example, in addition to the shutter releasing supporting portion 392, a second shutter releasing supporting portion 397 for releasing and supporting the shutter 207 under the condition that the disk cartridge 200 is inserted into the end of the cartridge holder is formed on the cartridge holder 34.

Specifically, the second shutter releasing supporting portion 397 is formed on the rear portion of the overhead plate surface portion 341 of the cartridge holder 34 with a width wider than that of the aforementioned shutter releasing supporting portion similarly to the shutter releasing supporting portion 392. The shutter releasing supporting portions 392, 397 are formed on the central portion and the rear portion of the cartridge holder 34, whereby the shutter 207 of the disk cartridge 200 can be more reliably supported even under the released condition. Therefore, even when the apparatus is shocked considerably, there is then no risk that the shutter is closed unintentionally.

As described above, according to the embodiments of the present invention, since the shutter 207 is opened before the disk cartridge 200 is passed through the chucking portion, i.e., the spacing between the turntable 362 and the disk damper 38, the whole of the loading apparatus 31 can be reduced in thickness.

Since the disk damper 38 can be directly attached to the cartridge holder 34, a complex mechanism such as a conventional damper supporting plate can be omitted and the apparatus can be made inexpensive and made highly reliable.

While the embodiments of the present invention were described so far, the present invention is not limited to those embodiments and may be modified without departing from the gist of the present invention.

As set forth, according to the disk cartridge loading apparatus of the present invention, since the shutter is opened before the disk cartridge is passed through the disk chucking portion and the disk is exposed to the outside, the spacing between the turntable and the disk damper constructing the disk chucking portion can be made a little larger than the thickness of the disk presented before the disk is chucked onto the disk chucking portion. Therefore, the loading mechanism can be reduced in thickness and the whole of the disk apparatus can be reduced in thickness. Also, the supporting mechanism for the disk damper can be omitted, whereby the arrangement can be simplified and the apparatus can be made inexpensive and highly reliable.

Furthermore, the opening operation of the shutter of the disk cartridge can be constantly carried out smoothly. The opened shutter can be reliably supported in the opened state, and the disk can be recorded and reproduced satisfactorily. Thus, the apparatus can made highly reliable much more.

Industrial Applicability

The present invention is not limited to the loading apparatus for a disk cartridge of an optical disk and may be applied to a loading apparatus of disk cartridge such as a magnetooptical disk or floppy disk. In this case, sizes and shapes of respective members may be varied in response to the disk used.

I claim:

1. A loading apparatus for a disk cartridge having an opening portion and a shutter provided freely movable so as to open and closed said opening portion, the loading apparatus comprising:
    a cartridge holder with said disk cartridge inserted thereto and supporting said inserted disk cartridge;
    a rotation drive means for supporting a disk housed in said disk cartridge in at least one direction of directions perpendicular to a surface of said disk cartridge, and for rotating said disk;
    a shutter releasing means for opening the shutter of said disk cartridge inserted into said cartridge holder, wherein said shutter releasing means releases said shutter of said disk cartridge, so that said shutter fully opens said opening portion before said disk cartridge inserted into said cartridge holder reaches said rotation drive means under the condition that said shutter of said disk cartridge is supported by a supporting means; and
    the supporting means for supporting said shutter opened by said shutter releasing means at a position in which said shutter opens said opening portion of said disk cartridge.

2. A loading apparatus for a disk cartridge as claimed in claim 1, wherein said shutter releasing means is rotatably provided in said cartridge holder and includes a releasing arm which is positioned at a disk cartridge insertion mouth side under the condition that said disk cartridge is not yet inserted into said cartridge holder, said releasing arm being engaged with said shutter of said disk cartridge inserted into said cartridge holder.

3. A loading apparatus for a disk cartridge having an opening portion for exposing a disk housed therein to the outside, a shutter for opening and closing said opening portion and a thin portion formed in correspondence with a position at which said shutter closes said opening portion, the loading apparatus comprising:
    a cartridge holder with said disk cartridge inserted thereto and supporting said inserted disk cartridge;
    a rotation drive means for rotating said disk housed in said disk cartridge;
    a shutter releasing means for releasing said shutter of said disk cartridge inserted into said cartridge holder, wherein said shutter releasing means moves said shutter of said disk cartridge to a position at which said thin portion of said disk cartridge is opened before said disk cartridge inserted into said cartridge holder reaches said rotation drive means, said shutter releasing means including
        a releasing lever rotatably provided and which is engaged with said shutter of said disk cartridge to move said shutter in the direction in which said shutter opens said opening portion of said disk cartridge and which is positioned at a disk cartridge insertion mouth side under the condition that said disk cartridge is not yet inserted into said cartridge holder, an engagement between said releasing lever and said shutter of said disk cartridge is released when said disk cartridge is further inserted into said cartridge holder after said releasing lever has released said shutter of said disk cartridge inserted into said cartridge holder, such that said shutter opens said thin portion of said disk cartridge, and a supporting means supports said shutter at a position in which said shutter opens said opening portion; and
    the supporting means for supporting said shutter, opened by said shutter releasing means, of said disk cartridge, at a position in which said shutter opens said opening portion of said disk cartridge.

4. A loading apparatus for a disk cartridge as claimed in claim 3, wherein said releasing lever is shaped as a substantially L-shaped lever and said releasing lever is attached to said cartridge holder such that a base end of said releasing lever is rotatably attached to said cartridge holder at a position behind the direction in which said rotation drive means inserts said disk cartridge.

5. A loading apparatus for a disc cartridge, the disc cartridge having an opening and a shutter provided freely movable so as to open and close the opening, said loading apparatus comprising:

a cartridge holder with the disc cartridge inserted thereto and holding the inserted disc cartridge;

a rotational drive means having a turntable and a holding member, said turntable for supporting the disc housed in the inserted disc cartridge in at least one direction of directions perpendicular to the surface of the disc cartridge, said holding member rotatably provided on said cartridge holder, said turntable and said holding member holding and rotating the disc housed in the inserted disc cartridge;

a shutter opening means for opening the shutter of the disc cartridge inserted into said cartridge holder, said shutter opening means having an opening arm pivotally provided on said cartridge holder, said opening arm being positioned at a disc cartridge insertion mouth side under the condition that said disc cartridge is not yet inserted into said cartridge holder, said opening arm engaging the shutter of the disc cartridge inserted into said cartridge holder; and a projection for supporting the shutter of the disc cartridge inserted into said cartridge holder, said projection being formed on said cartridge holder where the shutter is in an opened position, and said projection projecting outwardly from the cartridge holder so as to meet the disc cartridge as it is inserted into the cartridge holder, wherein said opening arm engages the shutter of the disc cartridge and is rotated by the disc cartridge toward said cartridge holder, the opening arm moving the shutter of the disc cartridge from a closed position to the fully open position according to the insertion operation of the disc cartridge into said cartridge holder, at which point said projection engages the shutter and supports the shutter in the open position and said opening arm is released from the shutter of the disc cartridge.

6. A loading apparatus for a disc cartridge according to claim 5, wherein said loading apparatus further comprises a misinsertion prevent portion provided on said cartridge holder for preventing the misinsertion operation of the disc cartridge into said cartridge holder.

7. A loading apparatus for a disc cartridge according to claim 6, wherein said misinsertion prevent portion comprises a second projection formed on the inside of said cartridge holder.

8. A loading apparatus for a disc cartridge, the disc cartridge having an opening, a shutter provided freely movable so as to open a close the opening, and a thin portion formed in correspondence with a position at which the shutter closes the opening, said loading apparatus comprising:

a cartridge holder having an inserting opening portion and with the disc cartridge inserted thereto and holding the inserted disc cartridge from said inserting opening portion;

a rotational drive means having a turntable and a holding member, said turntable for supporting the disc housed in the inserted disc cartridge in at least one direction of directions perpendicular to the surface of the disc cartridge, said holding member rotatably provided on said cartridge holder, said turntable and said holding member holding and rotating the disc housed in the inserted disc cartridge;

a shutter opening means for opening the shutter of the disc cartridge inserted into said cartridge holder, the shutter opening means having an opening arm formed as a substantially L-shaped lever, said opening arm having a proximal end portion rotatably attached to said cartridge holder at a position behind the direction in which the disk cartridge is inserted, and said opening arm also having a free end portion positioned to engage the shutter of the disc cartridge inserted into said cartridge holder; and a projection for supporting the shutter of the disc cartridge inserted into said cartridge holder, said projection being formed on said cartridge holder where the shutter is in an opened position, and said projection projecting outwardly from the cartridge holder so as to meet the disc cartridge as it is inserted into the cartridge holder, wherein said opening arm engages the shutter of the disc cartridge and is rotated by the disc cartridge toward said cartridge holder, the opening arm moving the shutter of the disc cartridge from a closed position to the open position according to the insertion operation of the disc cartridge into said cartridge holder, at which point said projection engages the shutter and supports the shutter in the open position and said opening arm is released from the shutter of the disc cartridge.

9. A loading apparatus for a disc cartridge according to claim 8, wherein said loading apparatus further comprises a misinsertion projection formed on said cartridge holder between said inserting opening portion and said holding member and for preventing the misinsertion operation of the disc cartridge into said cartridge holder.

* * * * *